March 6, 1962 L. E. PENTÉN 3,023,796
LOCK NUT HAVING HELICAL SPRING LOCKING MEANS
Filed April 29, 1959

Inventor
Lars Erik Penten
by Sommers & Young
Attorneys

United States Patent Office 3,023,796
Patented Mar. 6, 1962

3,023,796
LOCK NUT HAVING HELICAL SPRING LOCKING MEANS
Lars Erik Pentén, Danderyd, near Stockholm, Sweden
(Kullavagen 21, Lidingo 3, Sweden)
Filed Apr. 29, 1959, Ser. No. 809,719
Claims priority, application Sweden May 5, 1958
2 Claims. (Cl. 151—14)

The present invention relates to a lock nut having a locking screw spring provided in a boring which is concentric with the threadhole of the nut.

In known lock nuts of this type the nut has a radially extending slot which serves to receive a free spring end which is bent outwardly so that the screw spring cannot twist or turn relatively to the nut. However, in case of great stresses upon the nut it has been found that said outwardly bent free end of the screw spring has a tendency towards straightening out and creeping back into the nut boring, thus abolishing the locking or checking effect of the nut. Due to the fact that the spring is placed loosely in the boring and radial slot of the nut there will also arise certain difficulties in correctly positioning this lock nut.

It is an object of the present invention to eliminate these drawbacks and to provide a lock nut in which the screw spring even when exposed to heavy stress will remain in its correct position and retain its checking or locking function. Another object of the invention is to provide a lock nut with its screw spring attached therein in a manner such as to facilitate screwing of the lock nut onto a bolt.

In the lock nut according to the present invention, the screw spring has two bends to form a radially extending part which is inserted in a radial slot provided in the nut and open at its upper edge, and to form a ring which has a diameter greater than that of the spire of the screw spring and is inserted in a groove extending around the nut. This double bending provides a very great degree of safety in preventing the spring from sliding out of the nut slot, and by means of the annular extension in the groove of the nut the screw spring is always maintained in position in the nut.

Figure 1:
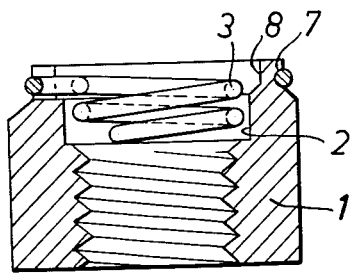
Figure 3:
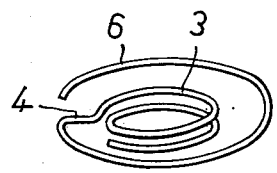
Figure 2:
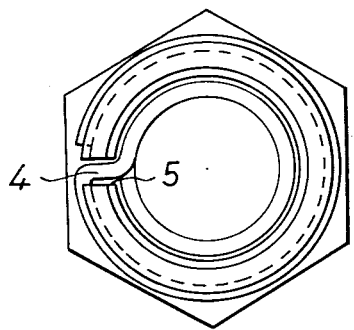
Figure 4:
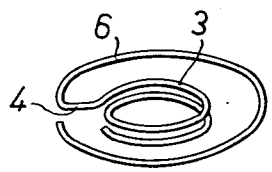

The invention will now be described in greater detail with reference to the attached drawing. FIG. 1 is a sectional view of a lock nut according to the invention. FIG. 2 is a plan view of the nut according to FIG. 1. FIGS. 3 and 4 show two embodiments of the locking or checking spring.

The nut block 1 is in a manner known per se provided with a boring 2 in its head portion which is concentric with the threadhole of the nut and has a diameter only slightly greater than that of the spire of the helical spring 3 which is positioned in the boring. At its outer end, the helical spring furthermore has a portion 4 which is bent radially outwardly and inserted in a radially extending slot 5 in that end face of the nut which lies adjacent to the boring 2. This slot opens to the outside and through the end of the edge portion of the head portion and is preferably so narrow as to leave no or only a very little play for a lateral movement of the portion 4 inside said slot. Contrary to known locking springs of this type the spring according to the invention has a further bend at the radial portion 4, and it has an annular extension 6 which is inserted in a groove 7 in the upper part of the nut. The end portion of extension 6 is preferably formed without any bend. The groove 7 has a substantially semicircular section with a radius conforming to the wire diameter of the locking spring. This second bend on the radial portion 4 of the locking spring can be directed into a direction opposite to that of the first bend (FIG. 3) or into the same direction (FIG. 4).

In the latter case, there will be obtained the advantage that upon turning of the nut in the locking direction the ring 6 tends to expand, so it can then more easily be lifted out of the groove 7 for withdrawing the screw spring 3 and loosening the nut.

It will be readily seen from the above statements that the screw spring 3 is held in position in the nut 1 by means of the annular extension 6 and is blocked against twisting or turning round relatively of the nut by means of the radial portion 4 in the slot 5. The helical portion 3 of the locking spring is guided by the boring 2, so that when the nut is screwed onto a bolt said helical portion engages quite safely with the threads of the bolt, and also the innermost spring end inside the boring will fit itself to the bolt threads. The said engagement between the screw spring 3 and the bolt thread is facilitated due to the fact that the spring is to some extent capable of axial movement because of the radial joint with the annular extension 6. This mobility is fully sufficient for taking up any pitch errors in the helical spring portion as well as any discrepancies that may arise between the position of the helical spring portion and the position of the nut thread. However, it will be clear that the lodgement of portion 6 of the spring in groove 7 will provide a pushing effect on the helical portion 3 at the time when the inner end of the helical portion is meeting the thread of a bolt and therefore resists the tendency of the spring as a whole to be moved axially out of its operative position.

Because of the bending in the locking spring and because of the extension it is possible, with the lock nuts according to the invention, to give the helical portion of the locking spring a length such as to provide for a fully sufficient torsional moment when the nut is drawn off, and nevertheless the nut can be screwed off without any deformation of the spring.

If the helical portion of the locking spring is given a length corresponding to so great a draw-off torsional moment that the nut could not be screwed off without deformation of the locking spring it is most suitable to provide the nut at its upper end with a further boring 8 having a diameter somewhat greater than that of the boring 2. This wide boring 8 enables the annular extension 6 of the locking spring to be lifted out of the groove 7 and the radial slot 5, whereupon the spring can readily be drawn out and the nut 1 finally be screwed off. The wide boring 8 also facilitates insertion of the screw spring 3 and takes up any size variations in said spring.

What I claim is:

1. A lock nut comprising a block provided with a hole formed with screw threads, said block having near its head end region a bore which extends from the adjacent end of said screw-threaded hole and is concentric therewith, the edge portion in the head region of said block being of a smaller transverse dimension than the rest of said block and said smaller portion being provided with a groove extending around the outer circumference thereof, said head region of said block being provided with a narrow radially extending slot which extends through the side and end of said edge portion connecting said bore with said groove, said nut being provided with a spring having a configuration with two bends such as to define three distinct spring portions, said three portions forming a helix extending from the innermost spring end towards the first bend, an intermediate portion between the two bends and extending radially outwardly from said helical portion, and an outer head portion extending from the second bend to the outer end of the spring and forming a substantially complete ring concentrically above the helical spring portion and with a diameter greater than that of said helical portion, said helical portion being lodged in the bore of said block with its innermost end adjacent said screw-threaded bore and free and resiliently movable inside said block and adaptable to fit itself into alignment with the threading of said hole, the radially extending portion of said spring being located in said narrow radially extending slot in the head region of said block, and the ring portion of said spring including the outer spring and being located in said groove around the outer circumference of said block in the portion thereof of smaller transverse dimension, and resiliently lodged within said groove so as to resist axial dislodgment of said spring and tipping of said spring around an axis located toward the outer part of said intermediate portion thereof when the nut is being screwed into functioning position in use, the diameter of said ring being no greater than the diameter of said rest of said block.

2. A lock nut according to claim 1, in which said ring portion of the spring is curved in the opposite angular direction to said helical portion of the spring.

References Cited in the file of this patent

FOREIGN PATENTS

| | | |
|---|---|---|
| 899,690 | France | Aug. 28, 1944 |
| 1,138,534 | France | June 14, 1947 |